(12) United States Patent
Fan et al.

(10) Patent No.: US 11,064,396 B2
(45) Date of Patent: Jul. 13, 2021

(54) CHANNEL RESERVATION SIGNAL DESIGN WITH DIFFERENT NUMEROLOGY

(71) Applicant: QUALCOMM Incorporated, San Diego, CA (US)

(72) Inventors: Zhifei Fan, San Diego, CA (US); Xiaoxia Zhang, San Diego, CA (US); Jing Sun, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 16/125,258

(22) Filed: Sep. 7, 2018

(65) Prior Publication Data

US 2019/0090161 A1     Mar. 21, 2019

Related U.S. Application Data

(60) Provisional application No. 62/559,383, filed on Sep. 15, 2017.

(51) Int. Cl.
*H04W 28/26*       (2009.01)
*H04W 74/08*       (2009.01)
(Continued)

(52) U.S. Cl.
CPC .......... *H04W 28/26* (2013.01); *H04W 72/04* (2013.01); *H04W 74/0816* (2013.01); *H04W 16/14* (2013.01)

(58) Field of Classification Search
CPC . H04W 28/26; H04W 74/0816; H04W 72/04; H04W 16/14; H04W 74/0808;
(Continued)

(56) References Cited

U.S. PATENT DOCUMENTS

| 2015/0223244 A1* | 8/2015 | Tabet | H04W 72/12 |
| | | | 370/329 |
| 2016/0095110 A1* | 3/2016 | Li | H04W 72/1215 |
| | | | 370/329 |

(Continued)

FOREIGN PATENT DOCUMENTS

| WO | 2016070114 A1 | 5/2016 | |
| WO | 2016133726 A1 | 8/2016 | |
| WO | WO-2017111857 A1 * | 6/2017 | ......... H04L 27/0006 |

OTHER PUBLICATIONS

Huawei., et al., "Coexistence and Channel Access for NR Unlicensed Band Operation", 3rd Generation Partnership Project (3GPP), Mobile Competence Centre, 650, Route Des Lucioles, Sophia-Antipolis Cedex, France, F-06921, R1-1713785, vol. RAN WG1, XP051316584, Aug. 21, 2017-Aug. 25, 2017 Aug. 20, 2017 (Aug. 20, 2017), 6 pages, Retrieved from the Internet:URL:http://www.3gpp.org/ftp/Meetings_3GPP SYNC/RAN1/Docs/ [retrieved on Aug. 20, 2017].

(Continued)

*Primary Examiner* — Ricky Q Ngo
*Assistant Examiner* — Michael K Phillips
(74) *Attorney, Agent, or Firm* — Norton Rose Fulbright LLP

(57) ABSTRACT

Certain aspects of the present disclosure relate to methods and apparatus for transmitting channel reservation signals. In one example, a device used a gating interval to gain access to a channel of a shared spectrum, performs a clear channel assessment to determine if the channel is available, selects a channel reservation signal from among a plurality of predetermined channel reservation signals if the channel is clear, and transmits the channel reservation signal upon the channel being clear. The channel reservation signal comprises a preamble, and a message, wherein the CR preamble and the CR message use a common numerology (Continued)

understood by at least one of different radio access technologies, and different numerologies in the same radio access technology, and the radio access technologies comprise WIFI and NR-SS.

28 Claims, 17 Drawing Sheets

(51) Int. Cl.
*H04W 72/04* (2009.01)
*H04W 16/14* (2009.01)

(58) Field of Classification Search
CPC . H04W 72/0446; H04W 74/08; H04W 88/06; H04W 72/1215; H04L 27/0006; H04L 5/0053

See application file for complete search history.

(56) References Cited

U.S. PATENT DOCUMENTS

| | | | |
|---|---|---|---|
| 2016/0135189 A1* | 5/2016 | Chandrasekhar | H04W 72/0453 370/329 |
| 2017/0048041 A1* | 2/2017 | Yi | H04W 8/005 |
| 2018/0167821 A1* | 6/2018 | Seok | H04L 5/0053 |
| 2018/0227911 A1* | 8/2018 | Belghoul | H04L 5/1469 |
| 2018/0288801 A1* | 10/2018 | Cierny | H04L 27/0008 |
| 2019/0335487 A1* | 10/2019 | Son | H04L 1/1812 |

OTHER PUBLICATIONS

International Search Report and Written Opinion—PCT/US2018/051149—ISA/EPO—Nov. 27, 2018.

* cited by examiner

An example of CR preamble design

US 11,064,396 B2

CHANNEL RESERVATION SIGNAL DESIGN WITH DIFFERENT NUMEROLOGY

This application claims priority to and the benefit of U.S. Provisional Patent Application No. 62/559,383 filed in the United States Patent and Trademark Office on Sep. 15, 2017, the entire content of which is incorporated herein by reference as is fully set forth below in its entirety and for all applicable purposes.

INTRODUCTION

The following relates generally to wireless communication, and more specifically to receiving on transmit and transmitting on receive.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

A method for transmitting universal channel reservation signals is described. The method may include using a gating interval to gain access to a channel of a shared spectrum, performing a clear channel assessment to determine if the channel is available, selecting a channel reservation signal from among a plurality of predetermined channel reservation signals if the channel is clear, and transmitting the channel reservation signal upon the channel being clear. The channel reservation signal comprises a preamble, and a message, wherein the message may indicate at least one of a transmission opportunity (TXOP), a target node, or an interference level. Also, the channel reservation signal provides an indication that the channel is reserved to operate according to a numerology. In addition, the channel reservation preamble and message use a common numerology understood by at least one of different radio access technologies, and different numerologies in the same radio access technology.

An apparatus for wireless communication is described. The apparatus may include means for using a gating interval to gain access to a channel of a shared spectrum, means for performing a clear channel assessment to determine if the channel is available, means for selecting a universal channel reservation signal from among a plurality of predetermined channel reservation signals if the channel is clear, and means for transmitting the channel reservation signal upon the channel being clear. In addition, the channel reservation signal comprises a preamble and a message which use a common numerology understood by at least one of different radio access technologies, and different numerologies in the same radio access technology.

A further apparatus is described. The apparatus may include a processor, memory in electronic communication with the processor, and instructions stored in the memory. The instructions may be operable to cause the processor to use a gating interval to gain access to a channel of a shared spectrum, perform a clear channel assessment to determine if the channel is available, select a universal channel reservation signal from among a plurality of predetermined universal channel reservation signals if the channel is clear, and transmit the channel reservation signal upon the channel being clear. In addition, the universal channel reservation signal comprises a preamble and a message use a common numerology understood by at least one of different radio access technologies, and different numerologies in the same radio access technology.

A non-transitory computer readable medium for wireless communication is described. The non-transitory computer-readable medium may include instructions to cause a processor to use a gating interval to gain access to a channel of a shared spectrum, perform a clear channel assessment to determine if the channel is available, select a universal channel reservation signal from among a plurality of predetermined universal channel reservation signals if the channel is clear, and transmit the universal channel reservation signal upon the channel being clear. In addition, the channel reservation signal comprises a preamble and a message which use a common numerology understood by at least one of different radio access technologies, and different numerologies in the same radio access technology

DETAILED DESCRIPTION

Figure 1:
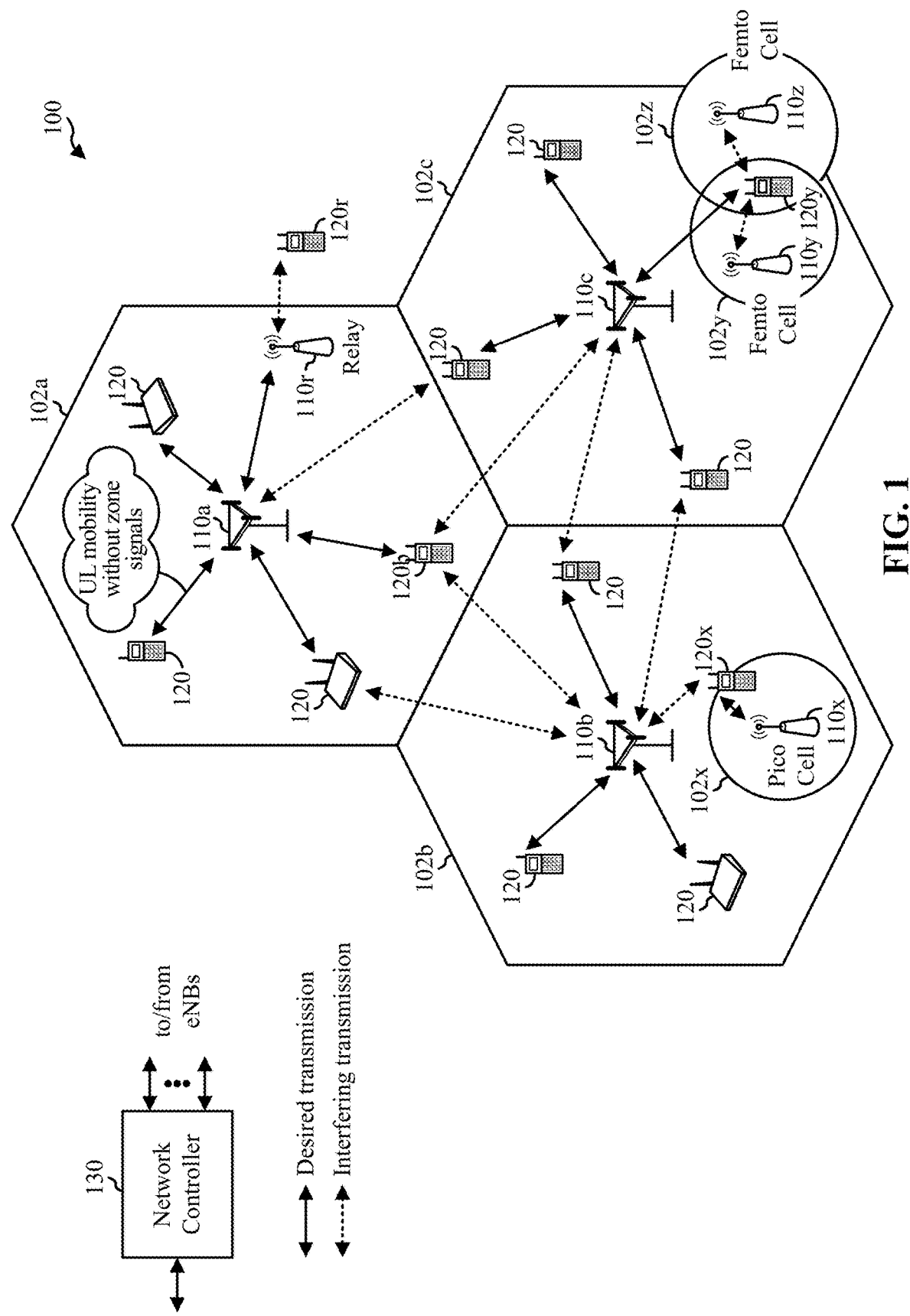
FIG. 1 is a block diagram conceptually illustrating an example telecommunications system, in accordance with certain aspects of the present disclosure.

With 5G NR, subcarrier spacing may be scaled. Also, the waveforms selected for 5G include CP-OFDM and DFT-Spread (DFT-S) OFDM. In the downlink LTE uses OFDM and DFT-S OFDM in the uplink. Also, 5G allows for switching between both CP OFDM and DFT-S-OFDM on the uplink to get the MIMO spatial multiplexing benefit of CP-OFDM and the link budget benefit of DFT-S OFDM.

Scalable OFDM multi-tone numerology is another feature of 5G. Prior versions of LTE supported a mostly fixed OFDM numerology of 15 kHz spacing between OFDM tones (often called subcarriers) and carrier bandwidths up to 20 MHz. Scalable OFDM numerology has been introduced in 5G to support diverse spectrum bands/types and deployment models. For example, 5G NR is able to operate in mmWave bands that have wider channel widths (e.g., 100s of MHz) than currently in use in LTE. Also, the OFDM subcarrier spacing is able to scale with the channel width, so the FFT size scales such that processing complexity does not increase unnecessarily, for wider bandwidths. In the present application, numerology refers to the different values different features of a communication system can take such as subcarrier spacing, cyclic prefix, symbol length, FFT size, TTI, etc.

Also in 5G NR, cellular technologies have been expanded into the unlicensed spectrum, both stand-alone and licensed-assisted (LAA). In addition, the unlicensed spectrum may occupy frequencies up to 60 GHz also known as mmWave.

The first member of this technology family is referred to as LTE-U. By aggregating LTE in unlicensed spectrum with an 'anchor' channel in licensed spectrum, faster downloads are enabled for customers. Also, LTE-U shares the unlicensed spectrum fairly with Wi-Fi. This is an advantage because in the 5 GHz unlicensed band Wi-Fi devices are in wide use, it is desirable for LTE-U to coexist with the Wi-Fi. However, an LTE-U network may cause RF interference to an existing co-channel Wi-Fi device. Choosing a preferred operating channel and minimizing the interference caused to nearby Wi-Fi networks is a goal for LTE-U devices. However, the LTE-U SC device may operate on the same channel as Wi-Fi if all available channels are occupied by Wi-Fi devices. To coordinate spectrum access between LTE-U and Wi-Fi, the energy across the intended transmission band is first detected. This energy detection (ED) mechanism informs the device of ongoing transmissions by other nodes. Based on this ED information, a device decides if it should transmit. Wi-Fi devices do not back off to LTE-U unless its interference level is above an energy detection threshold (−62 dBm over 20 MHz). Thus, without proper coexistence mechanisms in place, LTE-U transmissions could cause considerable interference on a Wi-Fi network relative to Wi-Fi transmissions.

Licensed Assisted Access or LAA Tis another member of the unlicensed technology family. Like LTE-U, it also uses an anchor channel in licensed spectrum. However, it also adds "listen before talk" (LBT) to the LTE functionality.

A gating interval may be used to gain access to a channel of a shared spectrum. The gating interval may determine the application of a contention-based protocol such as LBT protocol. The gating interval may indicate when a Clear Channel Assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically for a predefined transmission interval. Thus, with unlicensed spectrum, a "listen before talk" procedure is performed before transmitting a message. If the channel is not cleared for use, then a device will not transmit.

The final member of this family of unlicensed technologies is MulteFire. Unlike LTE-U and LAA, MulteFire allows entities without any access to licensed spectrum. Thus it operates in unlicensed spectrum on a standalone basis, that is, without any anchor channel in the licensed spectrum.

An expanded functionality for 5G involves the use of 5G NR Spectrum Sharing, or NR-SS. 5G spectrum sharing enables enhancement, expansion, and upgrade of the spectrum sharing technologies introduced in LTE. These include LTE Wi-Fi Aggregation (LWA), License Assisted Access (LAA), and CBRS/License Shared Access (LSA).

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station 120. In some examples, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). A BS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the sole entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP), or gNB) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
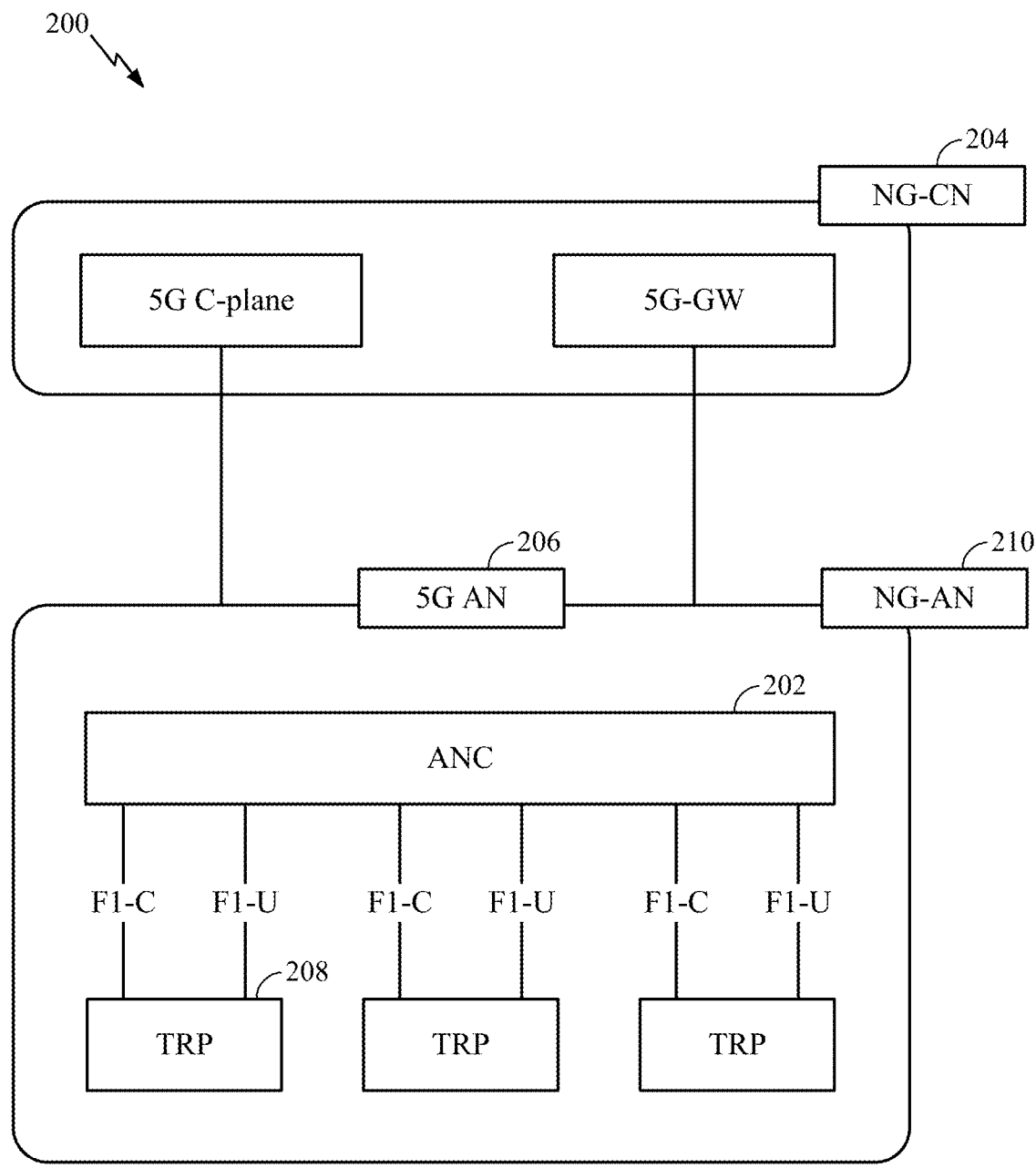
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
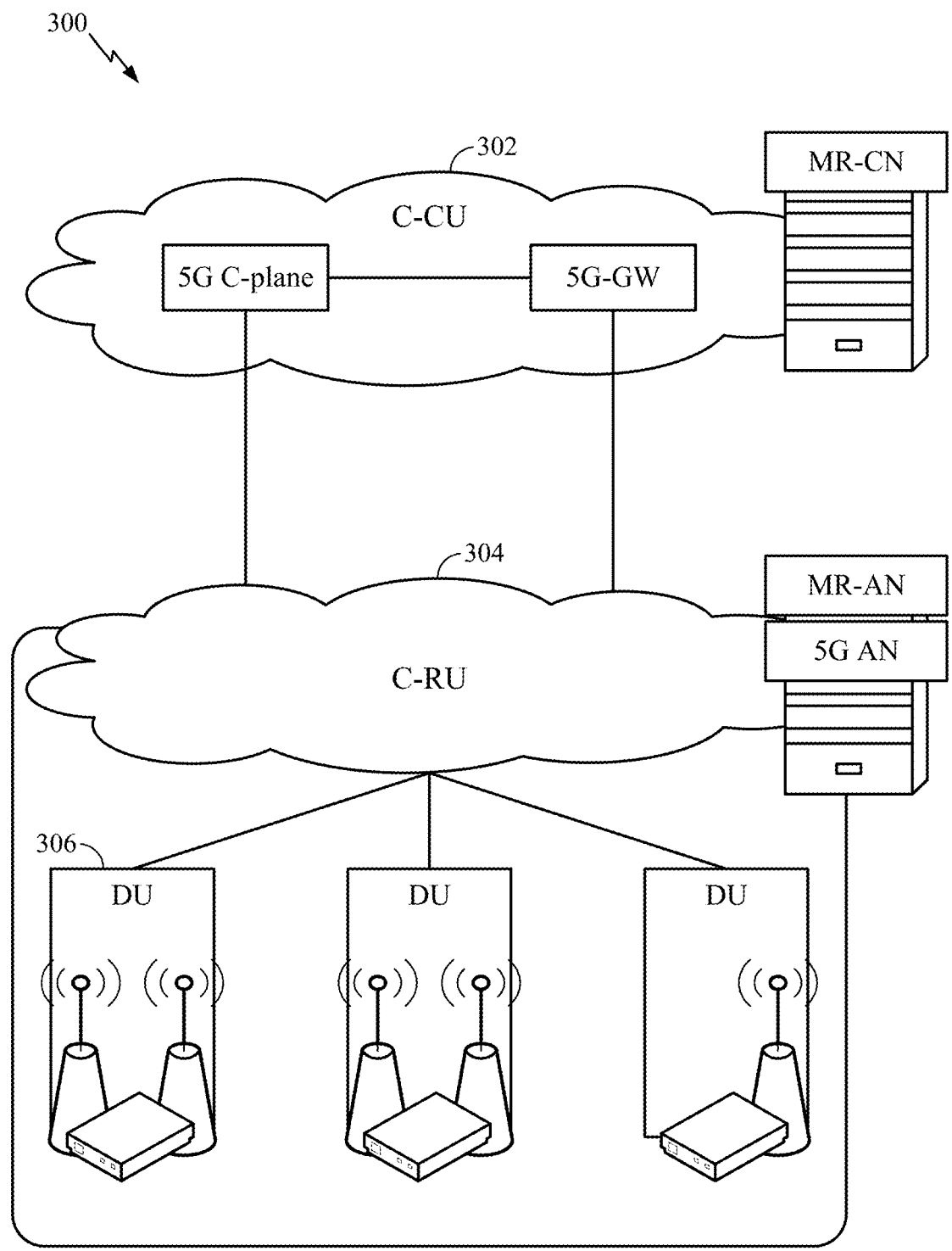
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
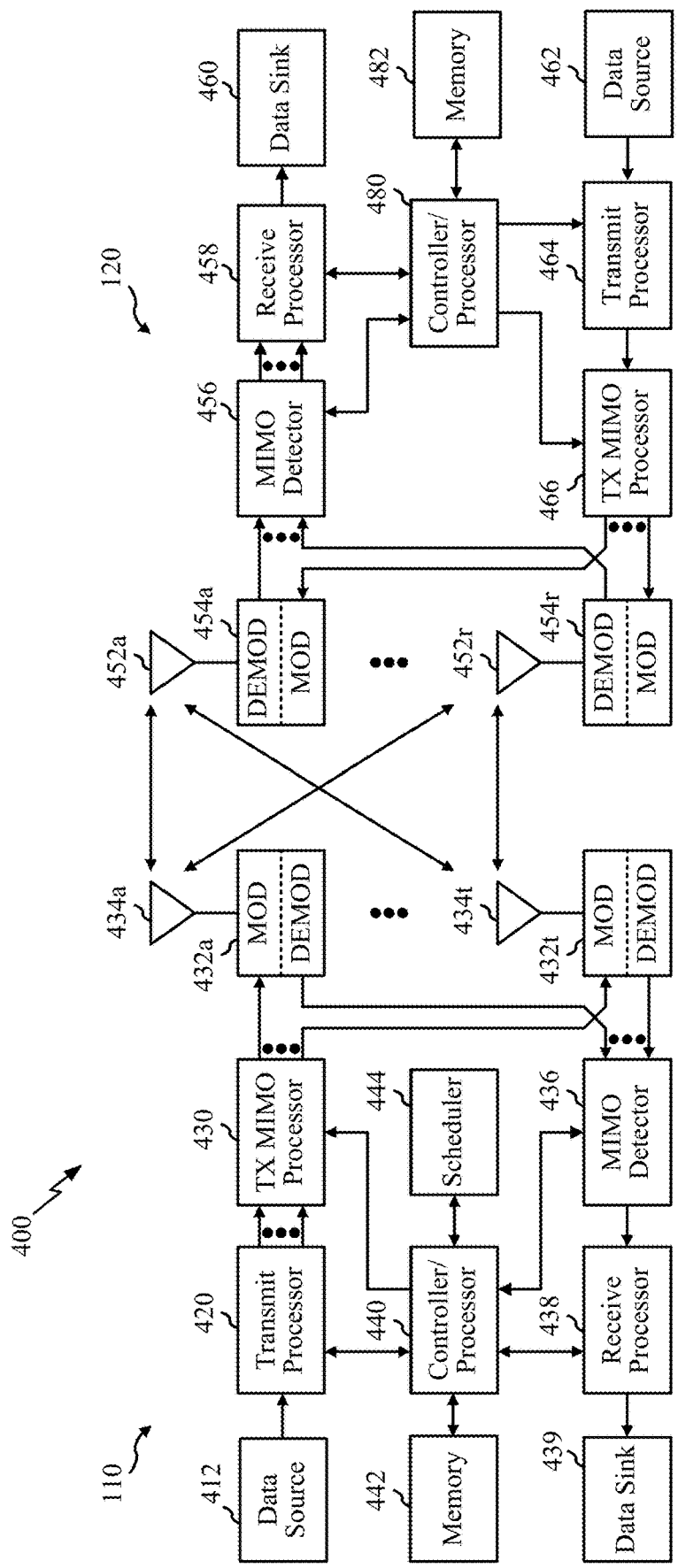
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 6-13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5A:
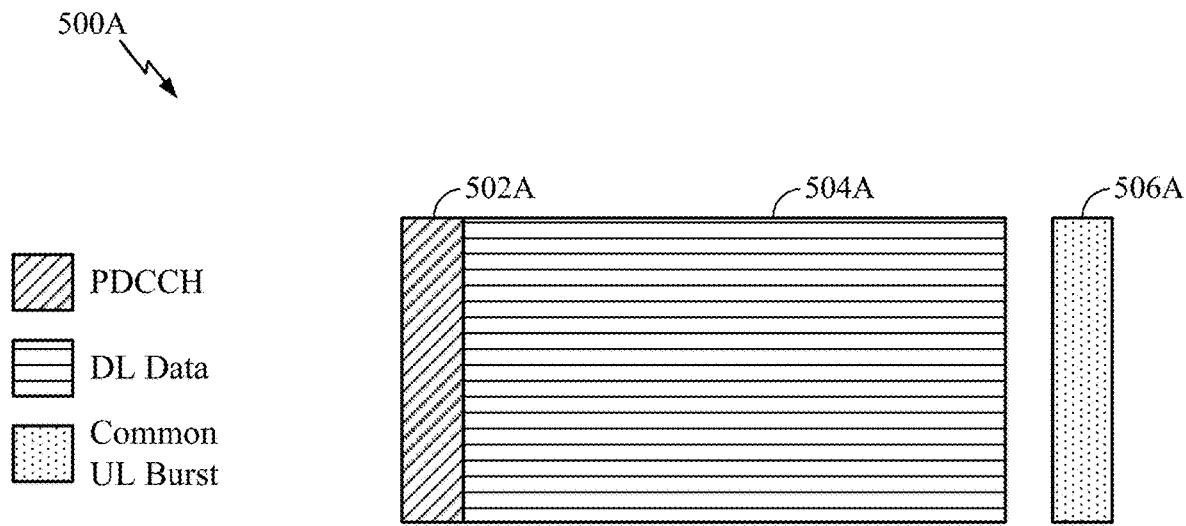
FIG. 5A is a diagram illustrating an example of a downlink (DL)-centric subframe according to some aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, BS, Node B, 5G NB, TRP, etc.) to the subordinate entity, e.g., UE 120. In some configurations, the DL data portion 504A may be a physical DL shared channel (PDSCH). The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity, e.g., UE 120) to UL communication (e.g., transmission by the subordinate entity e.g., UE 120). One of ordinary skill in the art will understand, however, that the foregoing is merely one example of a DL-centric subframe and alternative structures having similar features may exist without necessarily deviating from the aspects described herein.

Figure 5B:
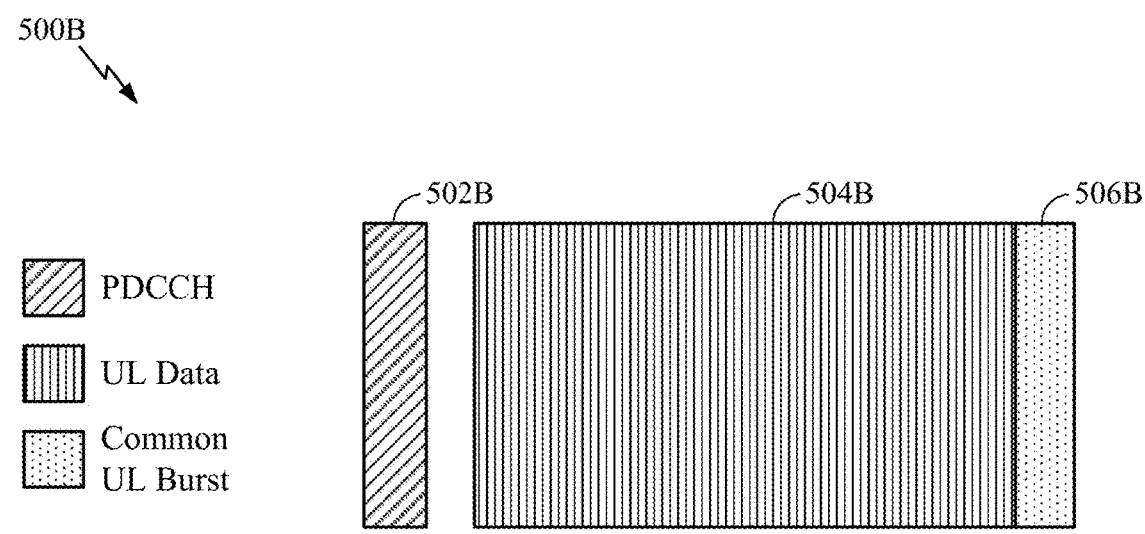
FIG. 5B is a diagram illustrating an example of an uplink (UL)-centric subframe according to some aspects of the present disclosure.

FIG. 5B is a diagram 500B showing an example of an UL-centric subframe.

The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity e.g., UE 120 to the scheduling entity 202 (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202) to UL communication (e.g., transmission by the scheduling entity 202). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

In the new radio (NR) unlicensed band, possibly different numerology for different system parameters (e.g., 15 khz, 30 Khz, 60 KHz subcarrier spacing) could be supported at the same time. WiFi could also work at the same band as one of the NR-SS technologies such as License Assisted Access (LAA), LTE Wi-Fi Aggregation (LWA), and CBRS/License Shared Access (LSA). As a result, co-existence issues may arise between the WiFi and the NR-SS technologies. (WiFi is based on the IEEE 802.11 standards and is a technology used for wireless local area networking with devices).

The present method and apparatus is intended to design a universal channel reservation signal such that no matter what numerology is used, a BS or UE could detect the channel reservation signal to avoid collisions. Similarly, the method and apparatus is intended to design a universal channel reservation signal such that no matter what radio access technology is used, a BS or UE could detect the channel reservation signal to avoid collisions. The channel reservation signal may be selected from more than one predetermined channel reservation signals.

This is advantageous because in NR 15 KHz, 30 KHz, and 60 KHz subcarrier spacing have been agreed for use in the sub 6 GHz band even though it is not clear which particular subcarrier spacing will be used for NR-SS. The present method and apparatus concerns the design of a channel reservation signal used with different numerologies along with the processing of the channel reservation signal at a receiver. In one example, the channel reservation signal can be processed by a receiver which uses different numerologies. In another example, the channel reservation signal can be processed by a receiver which uses different access technologies. The channel reservation signal may provide for satisfactory co-existence between WiFi and an NR-SS access technology like U-LTE.

Figure 6:
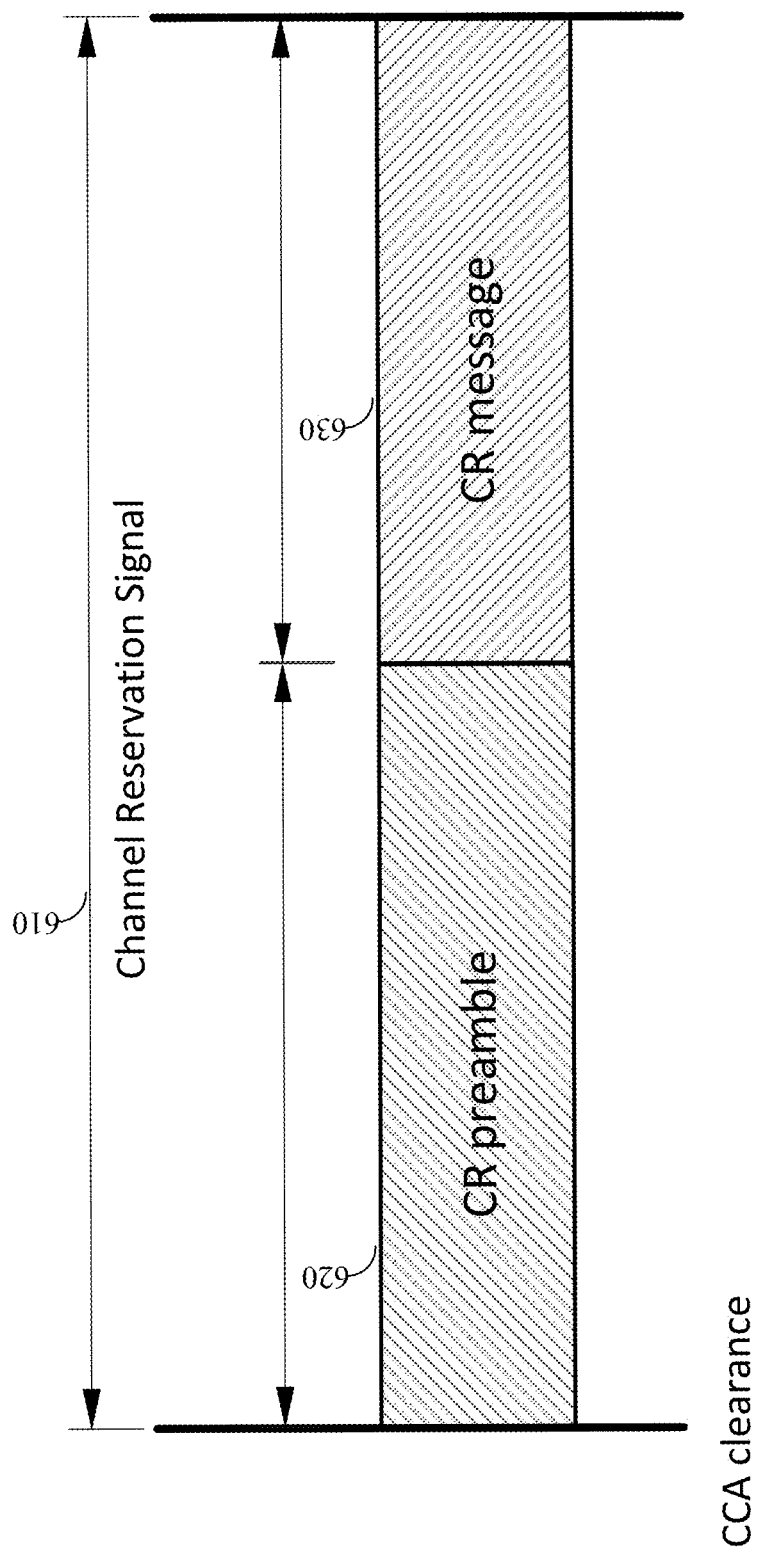
FIG. 6 illustrates a channel reservation signal consisting of two parts: a preamble+a message.

As shown in FIG. 6, the channel reservation signal 610 consists of two parts: a CR preamble 620+a CR message 630. The preamble is used to identify the upcoming transmission, while the message may indicate information such as transmission opportunity (TXOP), target node, interference level, access technology such as WiFi or NR-SS, etc. so that the receiver knows if it is the intended recipient or if the spectrum is being used by another node and it should back off. TxOP is granted by an access point to a terminal and refers to duration of time during which the station can send as many frame as it wishes. When a node knows the spectrum is being used by another node, the node (UE or BS) knows for how long it should back off from accessing the spectrum. A receiver (could be in both the BS and the UE) continually monitors the spectrum for a preamble. In one example the preamble is a simple waveform which is easy to detect. Whenever the receiver detects a preamble, it indicates that there is an upcoming signal. After that the receiver can go on to decode the CR message. As shown in FIG. 6, a CCA clearance may be run before the channel reservation signal is sent.

In one example, the present design of a channel reservation (CR) preamble could consist of multiple repetitions of the time domain waveform. An example of a time domain waveform is the short training field (STF) used in WiFi. A value for the repetition could be in one example ten repetitions. Advantages of repetition include the preamble is easier to detect and less errors occur.

With different subcarrier spacing (15 Khz/30 Khz/60 Khz), the sampling rate may remain the same. A 2048-fft could be used with a 15 Khz subcarrier spacing (2048*15 kHz=30.72 MHz); a 1024-fft could be used with 30 Khz subcarrier spacing (1024*30 kHz=30.72 MHz); or a 512-fft could be used with 60 Khz subcarrier spacing (512*60 kHz=30.72 MHz). As shown, the sampling rate remains the same in all three examples at 30.72 MHz. Therefore, the time domain processing of the multiple repetitions of the time domain waveform can be handled by a receiver with different subcarrier spacing.

Figure 7:
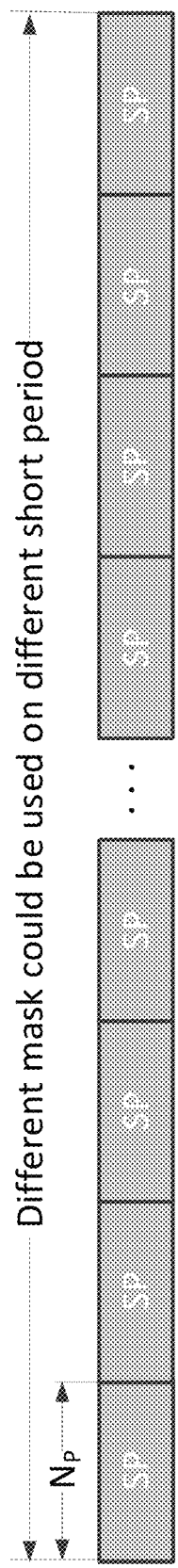
FIG. 7 is an example of using masks in a CR preamble design where SP represents short period and $N_p$ represents periodicity.

FIG. 7 is an example of using a cover comprising masks in a CR preamble design where SP represents short period and $N_p$ represents periodicity. In FIG. 7, different masks can be used with different short periods. For example, a cover comprised of either a 1, or −1 value for each SP can be placed over the CR preamble. For example [1,−1,1,−1, . . . 1,1,1, −1] can be applied to the CR preamble in FIG. 7 where 1 is applied to the first SP, −1 is applied to the second SP and so on. A default cover is one where all the masks are "1." Different covers are used to improve timing accuracy.

It is possible for the channel reservation (CR) message to be conveyed via a time domain waveform such as the one used in the CR preamble. Typically, the waveform based approach is suitable for carrying a limited information (e.g., a few bits). When the CR message cannot be conveyed in a few bits, the payload based design is beneficial where the message is carried in the payload. If that is the case, the receiver extracts pilot and data in corresponding frequency sub-carriers such as found in OFDM. When using different subcarrier spacing, the issue becomes how to design the CR message to allow the receiver to operate with different subcarrier spacing.

Figure 8:
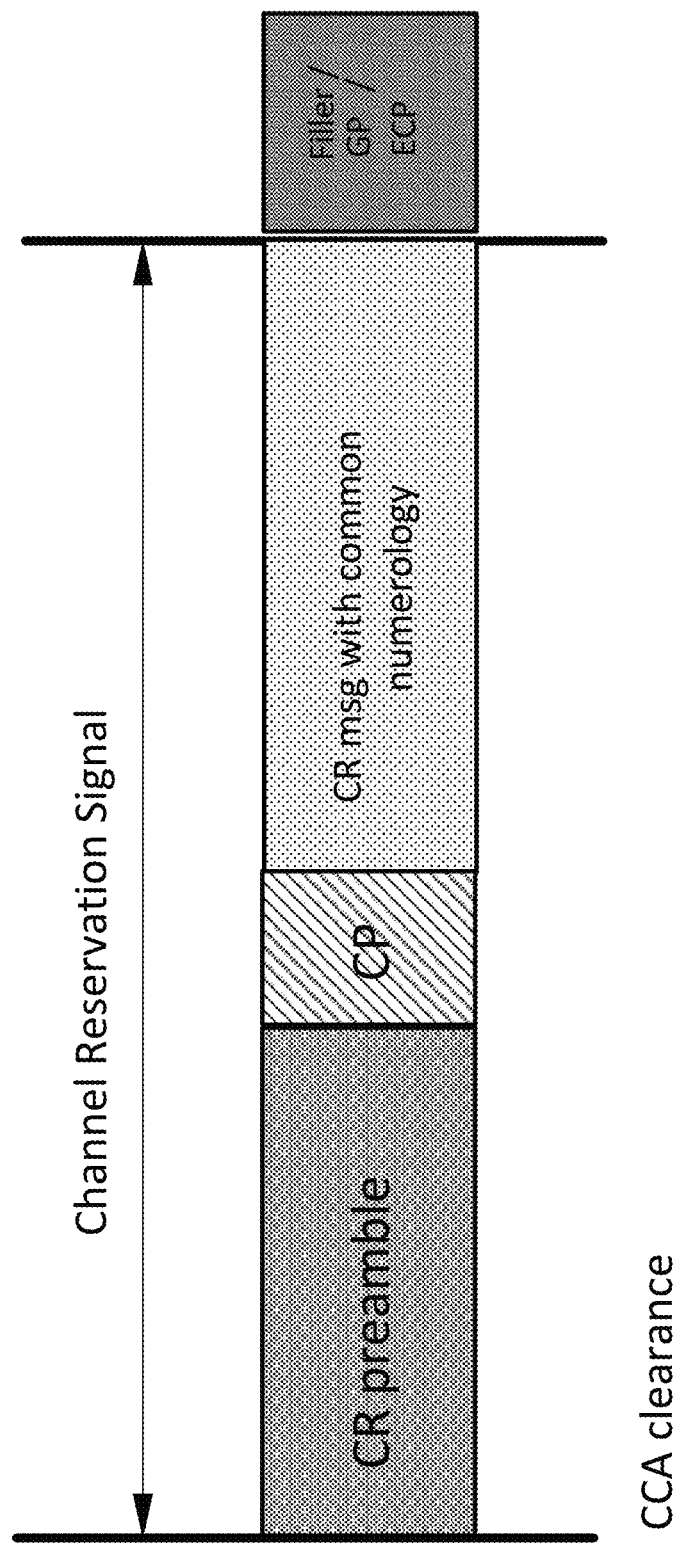
FIG. 8 is an example of a channel reservation signal using cyclic prefix and filler, guard period, or enhanced guard period.

The CR preamble is the same for each CR signal no matter what numerology is used in the device (i.e., the UE or BS) receiving the CR signal since the CR preamble is a time domain waveform. So despite what numerology the receiver is using, the detection algorithm used by the receivers in the different nodes is the same whether the node uses one of the NR-SS radio access technologies. FIG. 8 is an example of a channel reservation signal using cyclic prefix and filler, guard period, or enhanced guard period. In a first example of a channel reservation signal (CRS), a common numerology is used for the CR message with all nodes (UE or BS), while the nodes may use different numerology for communicating data. The receiver may use common numerology for detecting a CR message, while it may use different numerologies for the data detection. The reason is because data encoded using different numerologies are decoded using different detection algorithms. That is, the receiver detection algorithm uses different FFT sizes to decode data with different numerologies. There could be some extra filler signal or guard period (GP) at the end of the CR message to align it with the symbol boundary. In one example, the data is carried behind the filler/GP as shown in FIG. 8. Alternatively, the next symbol following last CR message may use extra cyclic prefix (CP). The amount of filler/GP/ECP depends on the numerology used for data. In one example, a common numerology may be understood by different radio access technologies, or different numerologies in the same radio access technology.

Figure 9:
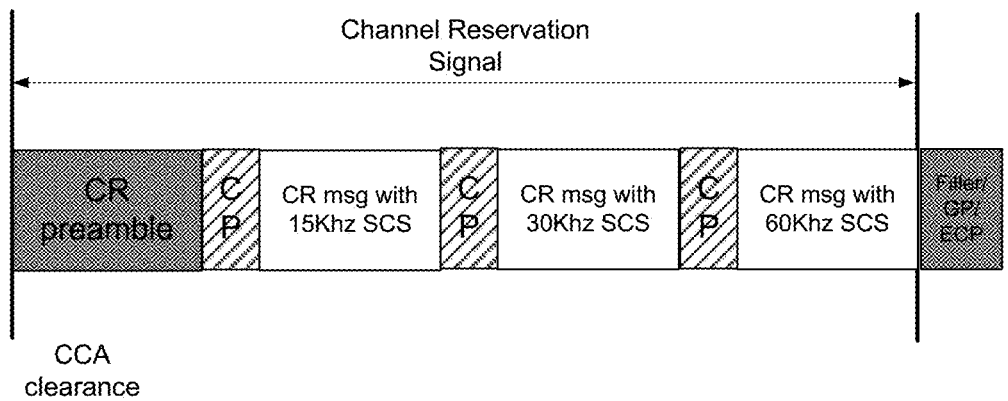
FIG. 9 is a second example of a channel reservation signal in which the CR message is sent with multiple copies, each copy corresponding to a numerology.

FIG. 9 is a second example of a channel reservation signal in which the CR message is repeated, i.e., sent with multiple copies, each copy corresponding to a different numerology. Here, the first CR message (or copy) is sent with a 15 kHz subcarrier spacing (SCS), the second CR message copy is sent with a 30 kHz SCS, and the third CR message is sent with a 60 kHz SCS. The receiver will use its own numerology to decode one of the CR messages. E.g., a receiver with a 15 kHz numerology would decode the CR message with a 15 kHz SCS. As discussed with the first example of a channel reservation signal, the CR preamble is the same for each CR signal no matter what numerology is used in the device (i.e., the UE or BS) receiving the CR signal since the CR preamble is a time domain waveform.

Figure 10:
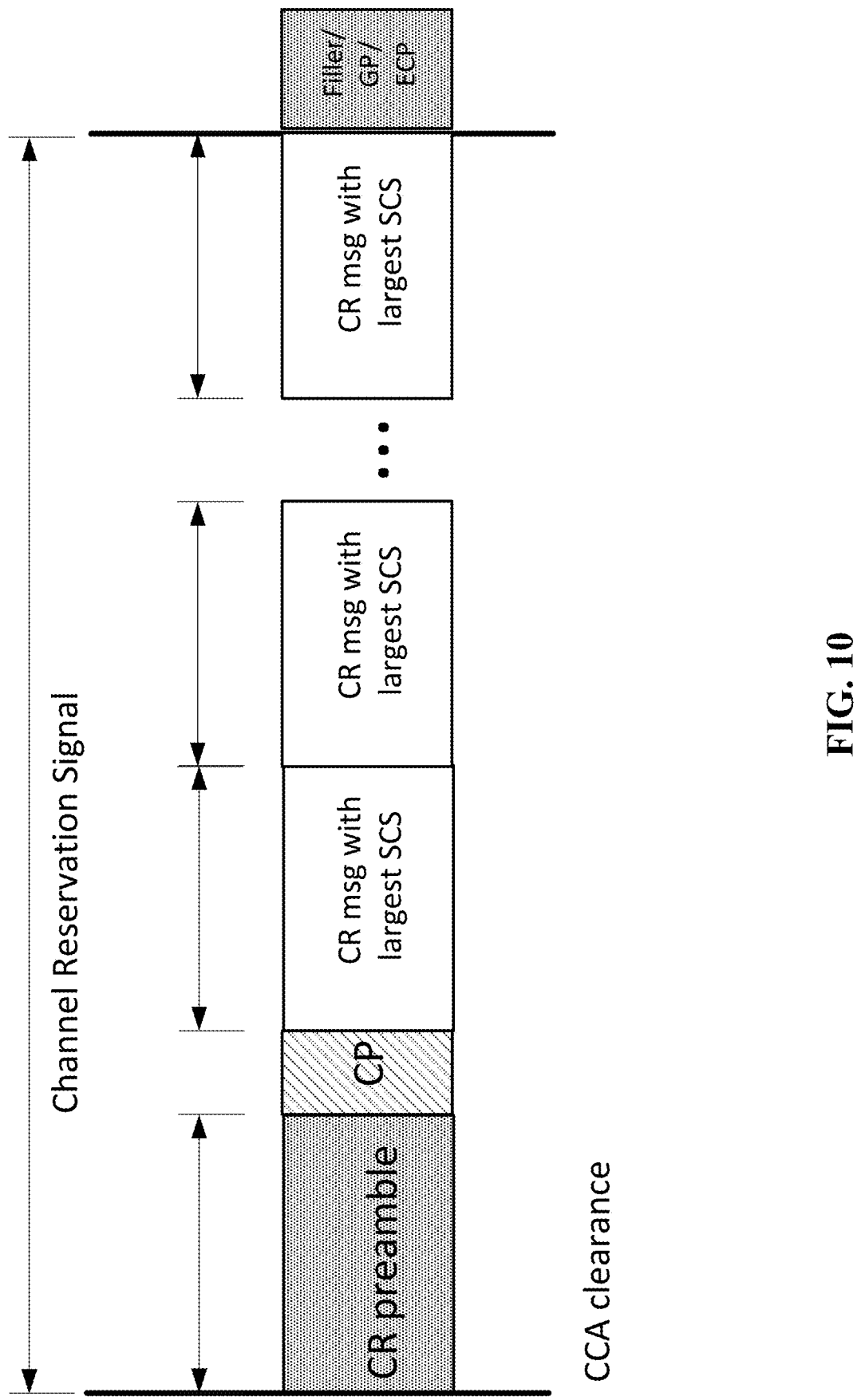
FIG. 10 is a third example of a channel reservation signal where the CR message consists of CP+message repeated in a few symbols.

FIG. 10 is a third example of a channel reservation signal. The CR message consists of CP+message repeated in a few symbols. Each message duration follows the largest subcarrier spacing. For example, the largest sub-carrier spacing used in sub6 Ghz is 60 Khz, where each CR message spans 1/60 kHz in the time domain. In a first example, there may be a CP prior to the first CR message, but in another example there is no CP in between of the repeated CR message symbols. The receiver with 60 Khz subcarrier spacing (SCS) can take samples corresponding to each CR message, perform combining, execute an FFT with a 60 Khz numerology, and extract corresponding subcarriers for processing.

The receiver with a 30 Khz/15 Khz SCS can take samples corresponding to every 2/4 CR messages, perform combining, execute an FFT with a 30 Khz/15 Khz numerology, and extract corresponding subcarriers for processing. So in FIG. 10 the receiver with 60 Khz subcarrier spacing (SCS) can take samples corresponding to every CR message, the receiver with 30 Khz subcarrier spacing (SCS) can take samples corresponding to every two out of four CR messages, and the receiver with 15 Khz subcarrier spacing (SCS) can take samples corresponding to every four CR messages. The multiple repeated CR messages allows the receiver to process with different numerologies with minimal implementation complexity As shown in FIG. 10 the CR message consists of CP+copies of the message using the largest numerology repeated every few symbols.

Figure 11:
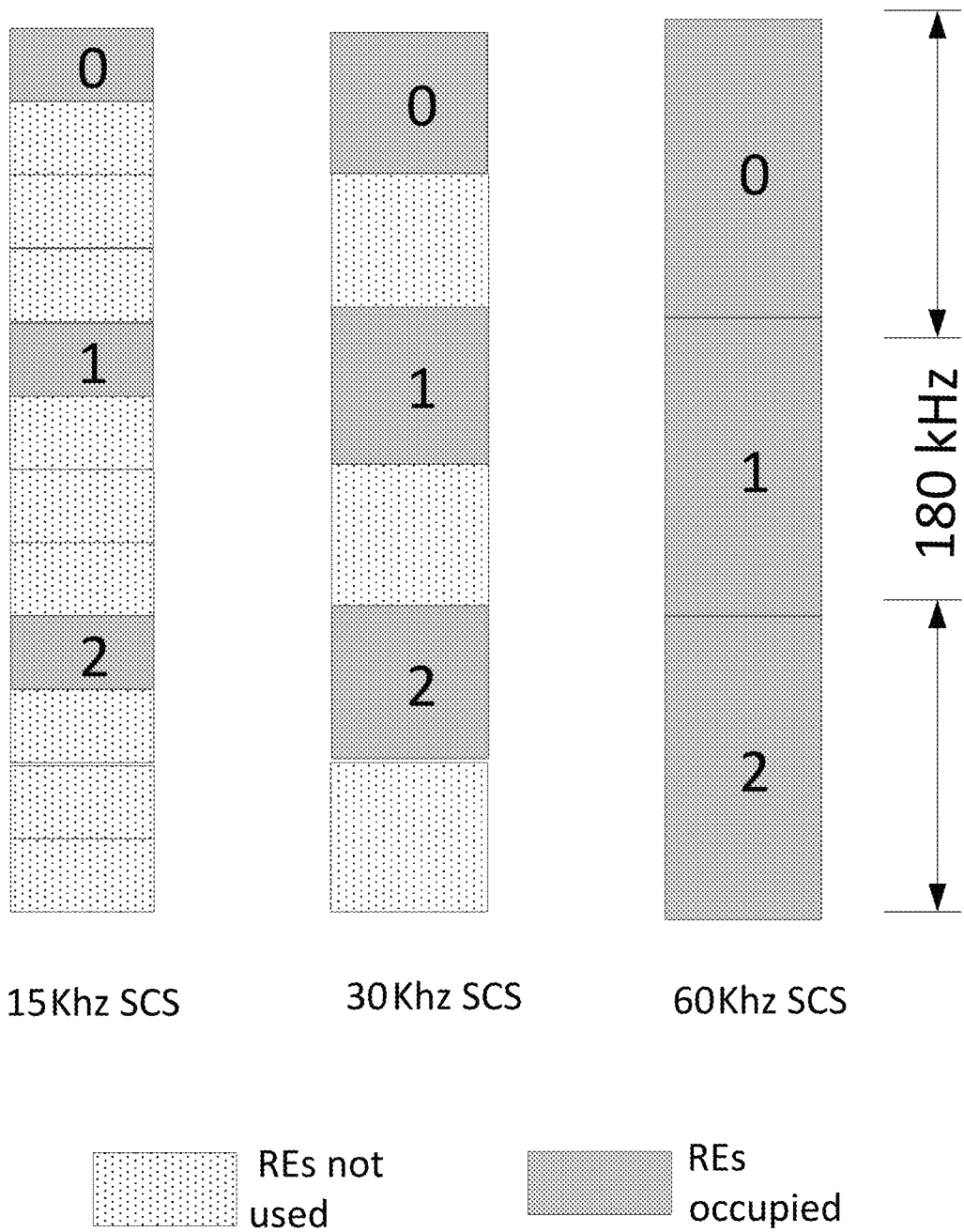
FIG. 11 is the third example of a channel reservation signal where the subcarrier spacing (SC S) are multiple integers of each other.
Figure 12:
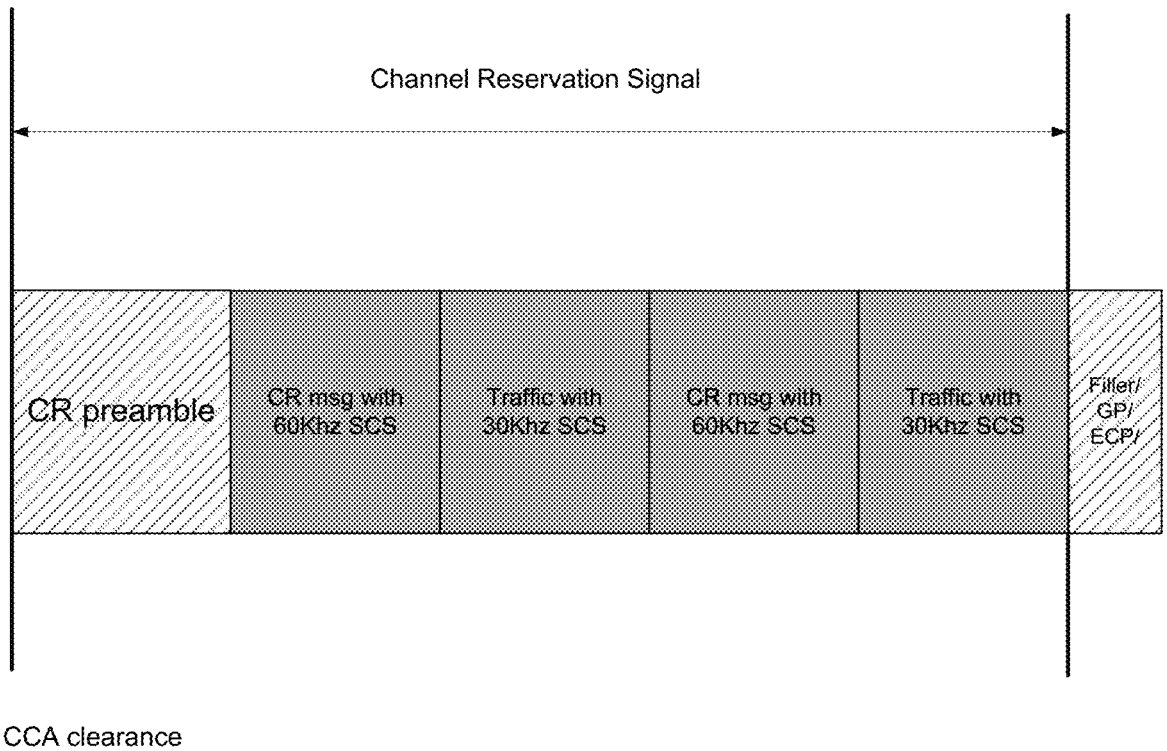
FIG. 12 is the third example of a channel reservation signal where the CR message and traffic are multiplexed.

FIG. 11 This example of a CR signal takes advantage of the fact that the SCS are multiple integers ($2^n$) of each other, where in one example, n=1 for 30 kHz SCS vs. 15 kHz SCS and n=2 for 60 kHz SCS vs. 15 kHz SCS. Therefore, a receiver can extract the frequency domain information with different numerology. The channel with smaller SCS exhibits the comb based structure shown in FIG. 11. Here for a SCS of 15 kHz, the channel reservation (CR) signal will be mapped every fourth subcarrier (comb-like pattern). 3 of the 4 REs are unused. For an SCS of 30 kHz, the channel reservation (CR) signal will be mapped every alternate subcarrier. 2 of the 4 REs are unused. For an SCS of 60 kHz, the channel reservation (CR) signal can be mapped to every subcarrier. All REs are occupied. When subcarrier spacing is 60 KHz, the tone spacing is 60 KHz. When subcarrier spacing is 30 KHz, the tone spacing between every two tones is 60 KHz. When subcarrier spacing is 15 KHz, the tone spacing between every four tones is 60 KHz. So, the frequency message in 60 KHz numerology is allocated to every tone. Equivalently, in 30 KHz, the frequency message is allocated to every other and in 15 KHz, the frequency message is allocated to every fourth tone. The channel structure can remain the same within the comb. For example, if the CR payload consists of both CR control (PDCCH) and CR data, each RBG in CR PDCCH may consist of 4 RBs with a 15 kHz SCS (assuming 60 KHz SCS is used for the CR payload). The corset design can be applied on the comb based structure (once every 4 REs in every 4 RBs), where corset is the interlaced design for small subcarrier spacing numerology.

As shown above, it is possible that the CR message may not span the entire BW. Take for example, a network where the system BW is 20 MHz, while the CR message can be conveyed via a subset of resource elements (REs). It would be beneficial if unused bandwidth (BW) could be used for normal traffic.

In a first option, normal traffic is multiplexed with the CR signal using the same numerology and transmitted multiple times without a cyclic prefix (CP) in between the normal traffic and the channel reservation signal (CRS).

In another option, the CR message (e.g., 60 KHz SCS) is multiplexed with normal traffic on the normal symbol (CP+body) assuming a system numerology (e.g., 30 KHz SCS) for the traffic. See FIG. 12. In this case, since there is no CP in between the repeated CR signals, the symbol boundary between CR message and the normal traffic may not be aligned. In this case, the normal traffic will have the same comb based structure as the CR payload as shown in FIG. 11.

The transmission will combine the normal traffic and CR message in time domain for signal generation. The receiver will also extract samples at different FFT boundaries to decode the CR message. For example, a 1024-fft could be used with 30 Khz subcarrier spaced traffic and a 512-fft could be used with 60 Khz subcarrier spaced CR messaging.

Examples 1 and 2 for the CR signal can be extended to NR-SS and WiFi coexistence and not just coexistence between NR-SS devices. Example 1 is to send the channel reservation signal with either an NR-SS or a WiFi numerology. With example 2, the channel reservation preamble can be sent via a common numerology (for example, WiFi numerology) which can be detected with a receiver having either an NR-SS or a WiFi numerology, while the CR message can be sent with both an NR-SS and a WiFi numerology. Both the WiFi and the NR-SS nodes understand the CR preamble since it is a simple waveform which is easy to detect. The CR message with NR-SS numerology will be understood by NR-SS nodes. The CR message with WiFi numerology will be understood by WiFi nodes. The CR message may be consistent between the WiFi and the NR-SS numerologies which means it is a common CR signal having information used by both the WiFI and NR-SS technologies. However, additional information may be conveyed using a CR message directed to a particular access technology. Besides the common CR message providing information, each numerology could multiplex additional information which is transparent to the other numerology. For example, the common CR message may include TXOP duration, radio access technology, etc. In addition, target node, frequency occupation information, interference level etc. may be added in the NR-SS CR message which may not be present in the WiFi CR message.

Figure 13:
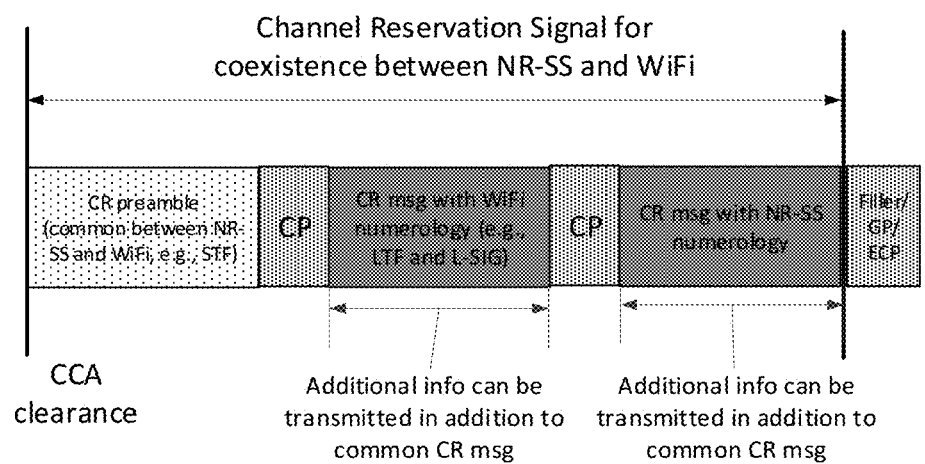
FIG. 13 is an example of a channel reservation signal for coexistence between NR-SS and WiFi.

FIG. 13 discloses a channel reservation signal which allows the NR-SS and WiFi technologies to co-exist. Additional information can be transmitted in the channel reservation signal message for the NR-SS technology or the WiFi in addition to information sent in a common channel reservation signal message as discussed above.

Figure 14:
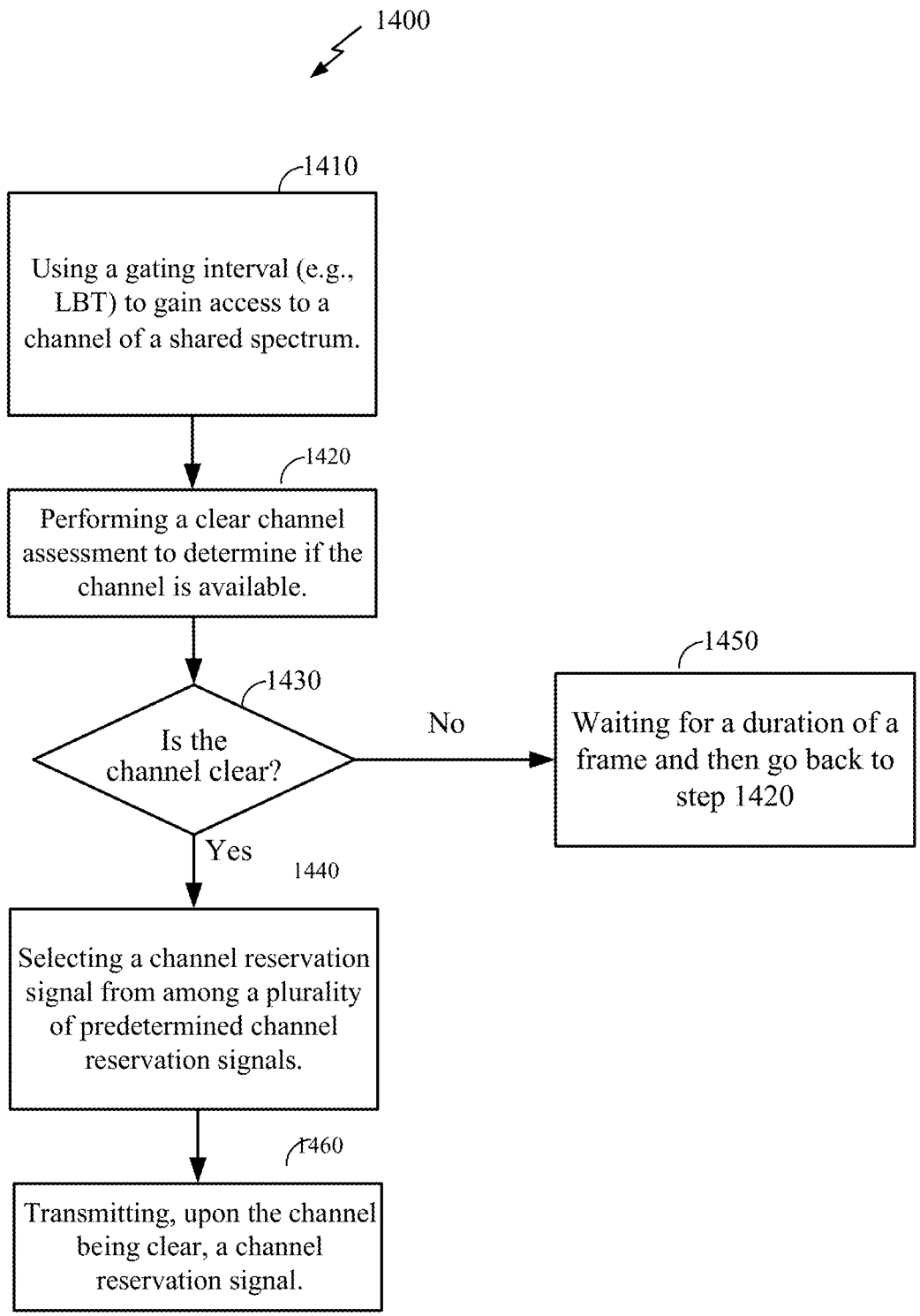
FIG. 14 illustrates a call flow 1400 of an exemplary process a UE 120 or BS 110 may follow when sending a channel reservation signal.

FIG. 14 illustrates a call flow 1400 of an exemplary process a UE 120 or BS 110 may follow when sending a channel reservation signal. At 1410, the UE 120 may use a gating interval (e.g., LBT) to gain access to a channel of a shared spectrum. At 1420, the UE 120 performs a clear channel assessment to determine if the channel is available. At 1430, the UE 120 determines if the channel is clear. If the channel is clear, at step 1440, the UE selects a channel reservation signal from among a plurality of predetermined channel reservation signals and then in step 1460 transmits a channel reservation signal. If the channel isn't clear, then at step 1450 the UE waits for a duration of time and then goes back to step 1420. The channel reservation signal may be detected by nearby U-LTE devices and nearby Wi-Fi devices listening on the channel and may back off accordingly for a period of time from trying to access the channel.

Figure 15:
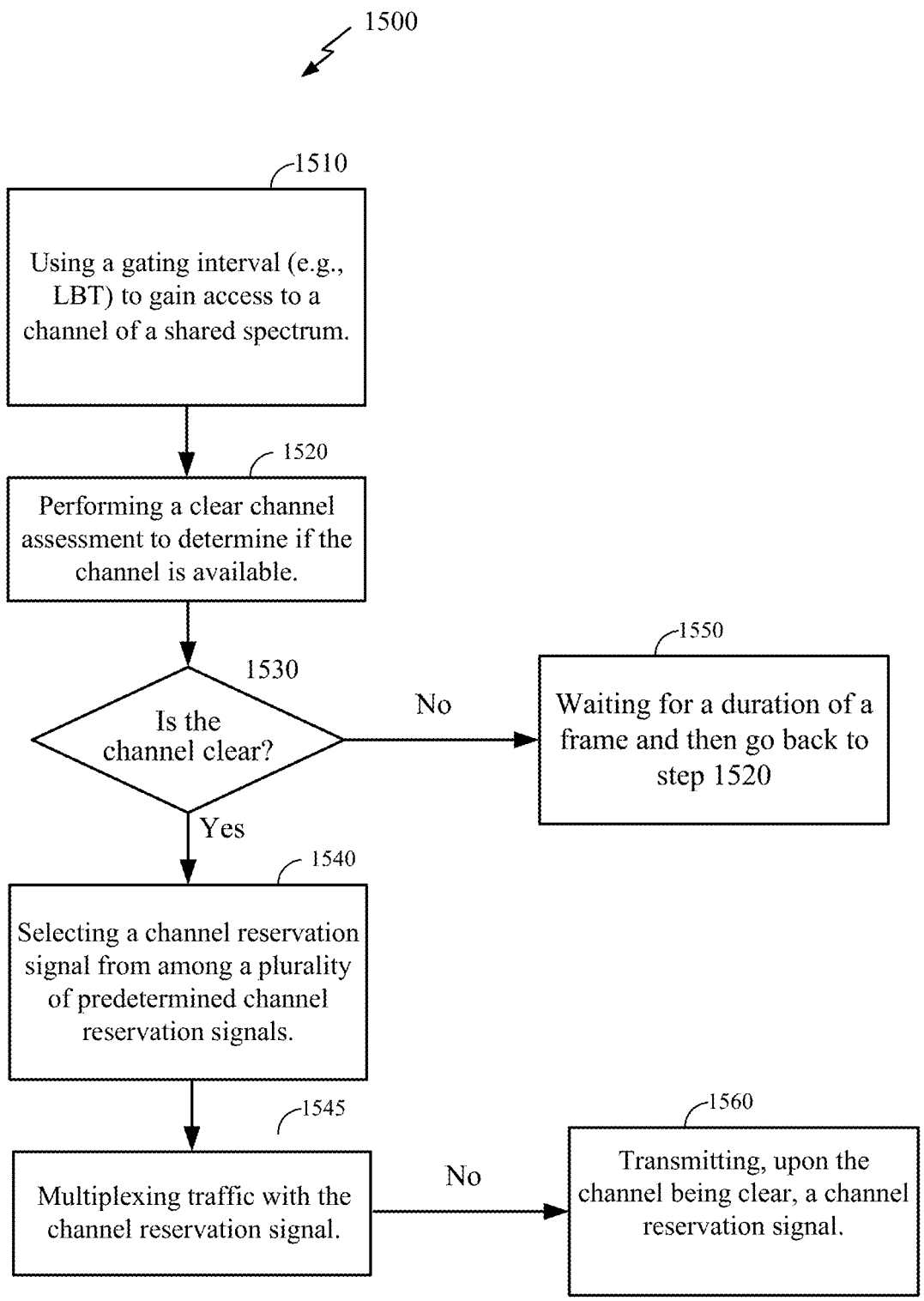
FIG. 15 illustrates a call flow 1500 of an exemplary process a UE 120 or BS 110 may follow when sending a channel reservation signal.

FIG. 15 illustrates a call flow 1500 of an exemplary process a UE 120 or BS 110 may follow when sending a channel reservation signal. At 1510, the UE 120 may use a gating interval (e.g., LBT) to gain access to a channel of a shared spectrum. At 1520, the UE 120 or BS performs a clear channel assessment to determine if the channel is available. At 730, the UE or BS determines if the channel is clear. If the channel is clear, at step 1540, the UE or BS selects a channel reservation signal from among a plurality of predetermined channel reservation signals. In step 1545 the UE or BS multiplexes traffic with the channel reservation signal. Then in step 1560 the UE or BS transmits the channel reservation signal with multiple message copies. If the channel isn't clear, then at step 1550 the UE or BS waits for a duration of time and then goes back to step 1520. The channel reservation signal may be detected by nearby U-LTE devices and nearby Wi-Fi devices listening on the channel and may back off accordingly for a period of time from trying to access the channel.

Figure 16:
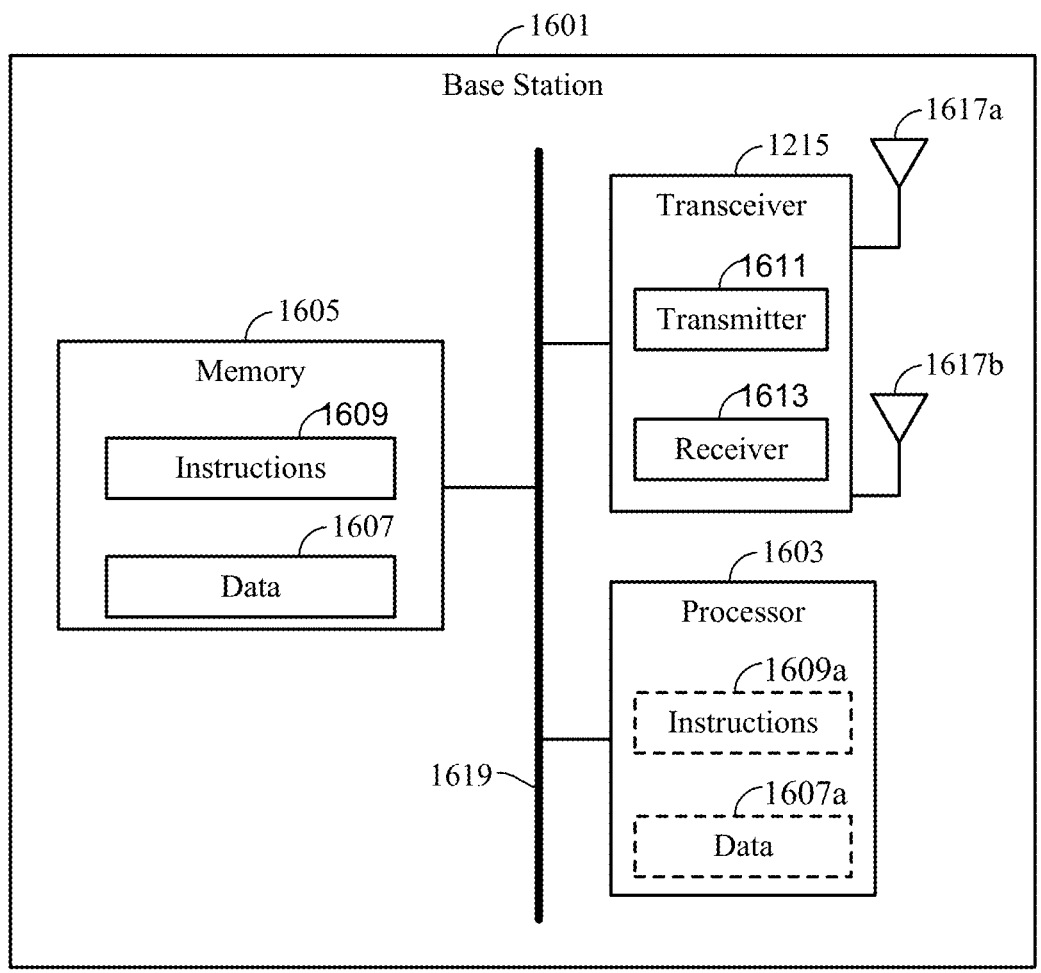
FIG. 16 illustrates certain components that may be included within a base station.

FIG. 16 illustrates certain components that may be included within a base station 1401. The base station 1601 may be an access point, a NodeB, an evolved NodeB, etc. The base station 1601 includes a processor 1603. The processor 1603 may be a general purpose single- or multi-chip microprocessor (e.g., an ARM), a special purpose microprocessor (e.g., a digital signal processor (DSP)), a microcontroller, a programmable gate array, etc. The processor 1603 may be referred to as a central processing unit (CPU). Although just a single processor 1603 is shown in the base station 1401 of FIG. 16, in an alternative configuration, a combination of processors (e.g., an ARM and DSP) could be used.

The base station 1601 also includes memory 1605. The memory 1605 may be any electronic component capable of storing electronic information. The memory 1605 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1607 and instructions 1609 may be stored in the memory 1605. The instructions 1609 may be executable by the processor 1603 to implement the methods disclosed herein. Executing the instructions 1609 may involve the use of the data 1607 that is stored in the memory 1605. When the processor 1603 executes the instructions 1609, various portions of the instructions 1609a may be loaded onto the processor 1603, and various pieces of data 1407a may be loaded onto the processor 1603.

The base station 1601 may also include a transmitter 1611 and a receiver 1613 to allow transmission and reception of signals to and from the wireless device 1601. The transmitter 1611 and receiver 1613 may be collectively referred to as a transceiver 1615. Multiple antennas 1617a-b may be electrically coupled to the transceiver 1415. The base station 1601 may also include (not shown) multiple transmitters, multiple receivers and/or multiple transceivers.

The various components of the base station 1601 may be coupled together by one or more buses, which may include a power bus, a control signal bus, a status signal bus, a data bus, etc. For the sake of clarity, the various buses are illustrated in FIG. 16 as a bus system 1619.

Figure 17:
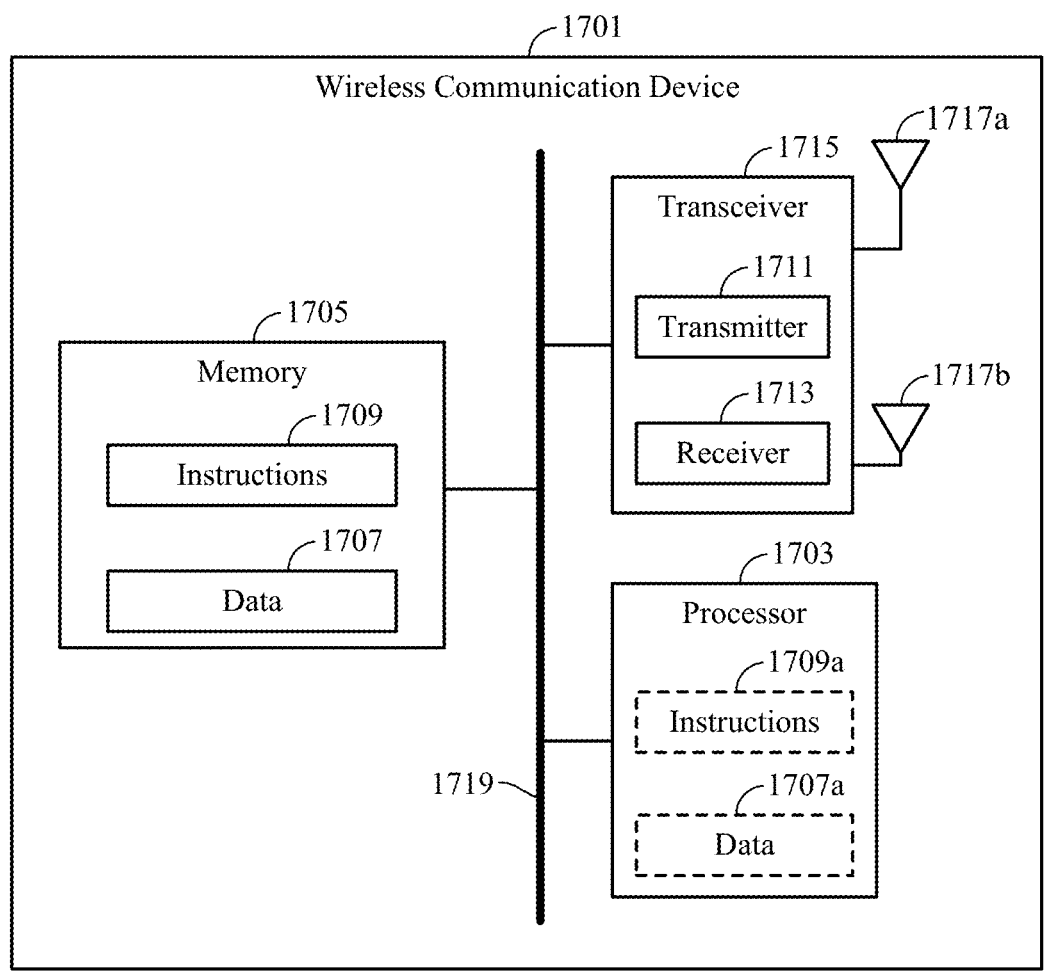
FIG. 17 illustrates certain components that may be included within a wireless communication device.

FIG. 17 illustrates certain components that may be included within a wireless communication device 1701. The wireless communication device 1701 may be an access terminal, a mobile station, a user equipment (UE), etc. The wireless communication device 1501 includes a processor 1703. The processor 1503 may be a general purpose single- or multi-chip microprocessor (e.g., an ARM), a special purpose microprocessor (e.g., a digital signal processor (DSP)), a microcontroller, a programmable gate array, etc. The processor 1703 may be referred to as a central processing unit (CPU). Although just a single processor 1703 is shown in the wireless communication device 1501 of FIG. 11, in an alternative configuration, a combination of processors (e.g., an ARM and DSP) could be used.

The wireless communication device 1701 also includes memory 1705. The memory 1705 may be any electronic component capable of storing electronic information. The memory 1705 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1707 and instructions 1709 may be stored in the memory 1705. The instructions 1509 may be executable by the processor 1703 to implement the methods disclosed herein. Executing the instructions 1709 may involve the use of the data 1707 that is stored in the memory 1705. When the processor 1703 executes the instructions 1709, various portions of the instructions 1709a may be loaded onto the processor 1703, and various pieces of data 1507a may be loaded onto the processor 1703.

The wireless communication device 1701 may also include a transmitter 1711 and a receiver 1713 to allow transmission and reception of signals to and from the wireless communication device 1701. The transmitter 1711 and receiver 1713 may be collectively referred to as a transceiver 1715. Multiple antennas 1717a-b may be electrically coupled to the transceiver 1515. The wireless communication device 1701 may also include (not shown) multiple transmitters, multiple receivers and/or multiple transceivers.

The various components of the wireless communication device 1701 may be coupled together by one or more buses, which may include a power bus, a control signal bus, a status signal bus, a data bus, etc. For the sake of clarity, the various buses are illustrated in FIG. 17 as a bus system 1719. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of transmitting a channel reservation signal, comprising:
    using a gating interval to gain access to a channel of a shared spectrum;
    performing a clear channel assessment to determine if the channel is clear;
    selecting the channel reservation signal from amongst a plurality of predetermined channel reservation signals when the determination is made that the channel is clear; and
    transmitting the channel reservation signal when the determination is made that the channel is clear,
    wherein each of the plurality of predetermined channel reservation signals comprises:
    at least one preamble; and
    at least one channel reservation (CR) message,
    wherein CR messages of at least two of the plurality of predetermined channel reservation signals use different numerologies,
    wherein transmitting the channel reservation signal when the determination is made that the channel is clear comprises transmitting the selected channel reservation signal with multiple channel reservation messages of the selected channel reservation signal, wherein at least one channel reservation message of the selected channel reservation signal corresponds to a different numerology from at least one other channel reservation message of the selected channel reservation message, and
    wherein numerologies of at least two of the multiple channel reservation messages of the selected channel reservation signal comprise different subcarrier spacings and belong to a same radio access technology family.

2. The method of claim 1, wherein the at least one CR message of each channel reservation signal may indicate at least one of transmission opportunity (TXOP), or a target.

3. The method of claim 1, wherein the at least one preamble of the selected CR signal and at least one of the multiple channel reservation messages of the selected CR signal use a common numerology understood by at least one of different radio access technologies, and different numerologies in the same radio access technology, wherein the radio access technologies comprise WIFI and NR-SS.

4. The method of claim 1, wherein the at least one preamble of the selected CR signal uses a common numerology understood by at least one of different radio access technologies, and different numerologies in the same radio access technology and the multiple channel reservation messages of the selected CR signal have copies for different of said radio technologies and said different numerologies in said same radio access technology, wherein the radio access technologies comprise WiFi and NR-SS.

5. The method of claim 1, wherein the at least one preamble of the selected CR signal and at least one of the multiple channel reservation messages of the selected CR signal use a common numerology understood by at least one of different radio access technologies, and different numerologies in the same radio access technology and at least one of the multiple channel reservation messages of the selected CR signal is generated using a largest subcarrier spacing; and wherein the selected CR signal comprises multiple repeated instances of at least one of the multiple channel reservation messages.

6. The method of claim 2, wherein the selected channel reservation signal provides an indication that the channel is reserved to operate according to a radio access technology, wherein the selected channel reservation signal is understood by devices with different numerologies in the same radio access technology family.

7. The method of claim 2, wherein the selected channel reservation signal provides an indication that the channel is reserved to operate according to a numerology, wherein the selected channel reservation signal is understood by different radio access technologies.

8. The method of claim 6, wherein the radio access technology is WiFi or an NR-SS technology.

9. The method of claim 7, further comprising:
coding data carried in the selected channel reservation signal with different numerologies using different FFT sizes depending on a receiver numerology.

10. The method of claim 7, wherein the different subcarrier spacings comprise one or more of a 15 khz, 30 Khz, or 60 KHz subcarrier spacing.

11. The method of claim 7, wherein a common said numerology is used for detecting the selected channel reservation signal, while at least one different said numerology is used for detecting data.

12. The method of claim 7, further comprising:
transmitting the at least one preamble of the selected channel reservation signal which can be detected with a receiver having either an NR-SS or a WiFi said numerology; and
transmitting at least one of the multiple channel reservation messages of the selected channel reservation signal with both an NR-SS and a WiFi said numerology.

13. An apparatus for transmitting a channel reservation signal, comprising:
means for using a gating interval to gain access to a channel of a shared spectrum;
means for performing a clear channel assessment to determine if the channel is clear;
means for selecting the channel reservation signal from amongst a plurality of predetermined channel reservation signals when the determination is made that the channel is clear; and
means for transmitting the channel reservation signal when the determination is made that the channel is clear;
wherein each of the plurality of predetermined channel reservation signals comprises:
at least one preamble; and
at least one channel reservation (CR) message,
wherein CR messages of at least two of the plurality of predetermined channel reservation signals use different numerologies,
wherein the means for transmitting the channel reservation signal when the determination is made that the channel is clear comprises a means for transmitting the selected channel reservation signal with multiple channel reservation messages of the selected channel reservation signal, wherein at least one channel reservation message of the selected channel reservation signal corresponds to a different numerology from at least one other channel reservation message of the selected channel reservation message, and
wherein numerologies of at least two of the multiple channel reservation messages of the selected channel reservation signal comprise different subcarrier spacings and belong to a same radio access technology family.

14. The apparatus of claim 13, wherein the at least one CR message of each CR signal may indicate at least one of transmission opportunity (TXOP), or a target.

15. The apparatus of claim 13, wherein the at least one preamble of the selected CR signal and at least one of the multiple channel reservation messages of the selected CR signal use a common numerology understood by at least one of different radio access technologies, and different numerologies in the same radio access technology, wherein the radio access technologies comprise WIFI and NR-SS.

16. The apparatus of claim 13, wherein the at least one preamble of the selected CR signal uses a common numerology understood by at least one of different radio access technologies, and different numerologies in the same radio access technology and the multiple channel reservation messages of the selected CR signal have copies for different of said radio access technologies or said different numerologies in said same radio access technology, wherein the radio access technologies comprise WIFI and NR-SS.

17. The apparatus of claim 13, wherein the at least one preamble of the selected CR signal and at least one of the multiple channel reservation messages of the selected CR signal use uses a common numerology understood by at least one of different radio access technologies, and different numerologies in the same radio access technology and at least one of the multiple channel reservation messages of the selected CR signal is generated using a largest subcarrier spacing; and wherein the selected CR signal comprises multiple repeated instances of at least one of the multiple channel reservation messages.

18. The apparatus of claim 14, wherein the selected channel reservation signal provides an indication that the channel is reserved to operate according to a radio access technology, wherein the selected channel reservation signal is understood by devices with different numerologies in the same radio access technology family.

19. The apparatus of claim 14, wherein the selected channel reservation signal provides an indication that the channel is reserved to operate according to a numerology, wherein the selected channel reservation signal is understood by different radio access technologies.

20. The apparatus of claim 18, wherein the radio access technology is WiFi or an NR-SS technology.

21. The apparatus of claim 19, further comprising:
coding data carried in the selected channel reservation signal with different numerologies using different FFT sizes depending on a receiver numerology.

22. The apparatus of claim 19, wherein the different subcarrier spacings comprise one or more of a 15 khz, 30 Khz, or 60 KHz subcarrier spacing.

23. The apparatus of claim 19, wherein a common said numerology is used for detecting the selected channel reservation signal, while at least one different said numerology is used for detecting data.

24. The apparatus of claim 19, further comprising:
means for transmitting the at least one preamble of the selected channel reservation signal which can be detected with a receiver having either an NR-SS or a WiFi said numerology; and
means for transmitting at least one of the multiple channel reservation messages of the selected channel reservation signal with both an NR-SS and a WiFi said numerology.

25. An apparatus to transmit a channel reservation signal, comprising:
a memory;
a radio frequency (RF) resource; and
a processor coupled to the memory and the RF resource, configured to:
use a gating interval to gain access to a channel of a shared spectrum;
perform a clear channel assessment to determine if the channel is clear;
select the channel reservation signal from amongst a plurality of predetermined channel reservation signals when the determination is made that the channel is clear, and
transmit the channel reservation signal when the determination is made that the channel is clear
wherein each of the plurality of predetermined channel reservation signals comprises:
at least one preamble; and
at least one channel reservation (CR) message,
wherein CR messages of at least two of the plurality of predetermined channel reservation signals use different numerologies,
wherein transmitting the channel reservation signal when the determination is made that the channel is clear comprises transmitting the selected channel reservation signal with multiple channel reservation messages of the selected channel reservation signal, wherein at least one channel reservation message of the selected channel reservation signal corresponds to a different numerology from at least one other channel reservation message of the selected channel reservation message, and
wherein numerologies of at least two of the multiple channel reservation messages of the selected channel reservation signal comprise different subcarrier spacings and belong to a same radio access technology family.

26. The apparatus of claim 25, wherein the at least one CR message of the each CR signal may indicate at least one of transmission opportunity (TXOP), or a target.

27. The apparatus of claim 26, wherein the at least one preamble of the selected CR signal and at least one of the multiple channel reservation messages of the selected CR signal use a common numerology understood by at least one of different radio access technologies, and different numerologies in the same radio access technology, wherein the radio access technologies comprise WiFi and NR-SS.

28. A non-transitory processor-readable storage medium having stored thereon processor-executable instructions configured to cause a processor of an apparatus to transmit a channel reservation signal, comprising:
use a gating interval to gain access to a channel of a shared spectrum;
perform a clear channel assessment to determine if the channel is clear;
select a channel reservation signal from amongst a plurality of predetermined channel reservation signals when the determination is made that the channel is clear; and
transmit the channel reservation signal when the determination is made that the channel is clear,
wherein each of the plurality of predetermined channel reservation signals comprises:
at least one preamble; and
at least one channel reservation (CR) message,
wherein CR messages of at least two of the plurality of predetermined channel reservation signals use different numerologies,
wherein transmitting the channel reservation signal when the determination is made that the channel is clear comprises transmitting the selected channel reservation signal with multiple channel reservation messages of the selected channel reservation signal, wherein at least one channel reservation message of the selected channel reservation signal corresponds to a different numerology from at least one other channel reservation message of the selected channel reservation message, and
wherein numerologies of at least two of the multiple channel reservation messages of the selected channel reservation signal comprise different subcarrier spacings and belong to a same radio access technology family.

* * * * *